July 8, 1952
F. C. EASTMAN
2,602,671
FLUID PRESSURE POWER CONTROL VALVE
MECHANISM FOR TWO-WAY SYSTEMS
Filed March 27, 1945
3 Sheets-Sheet 1
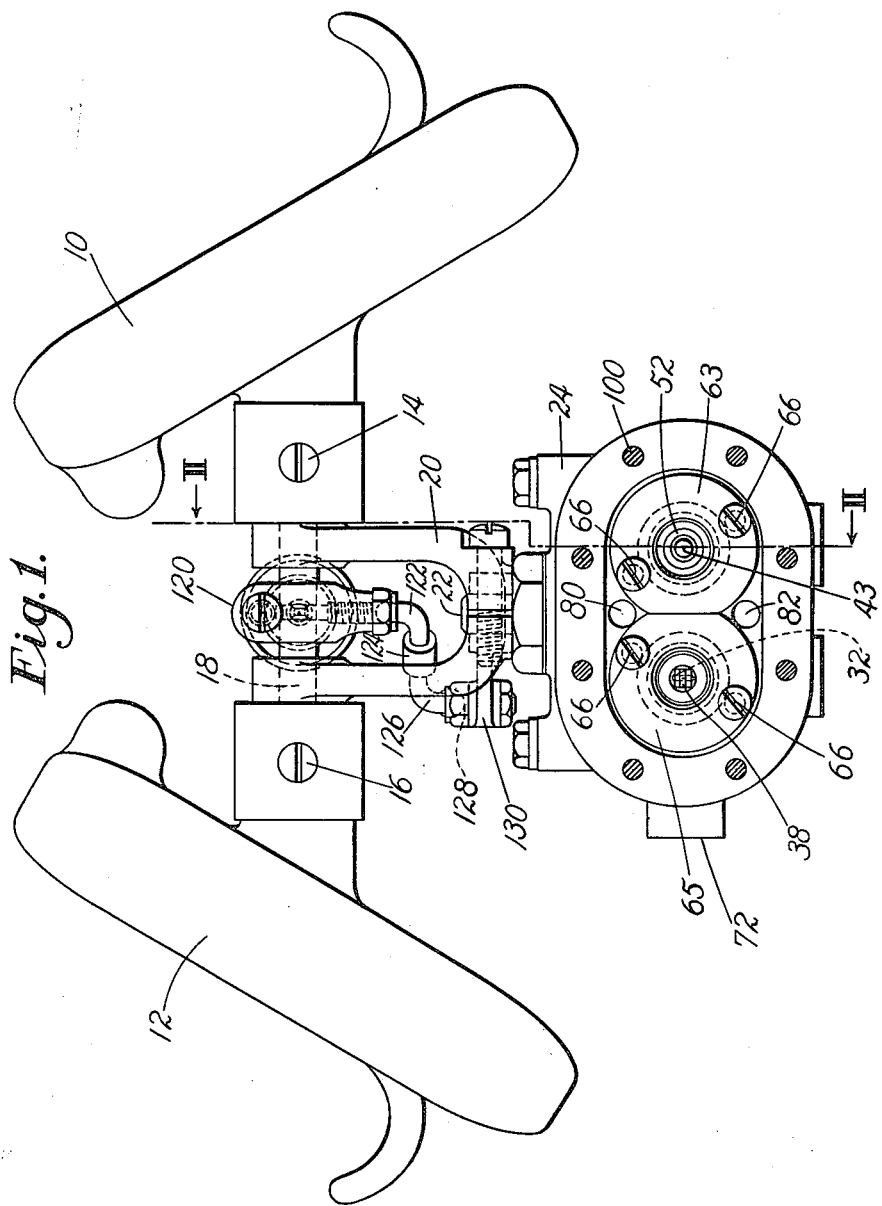
Inventor
Fred C. Eastman
By his Attorney

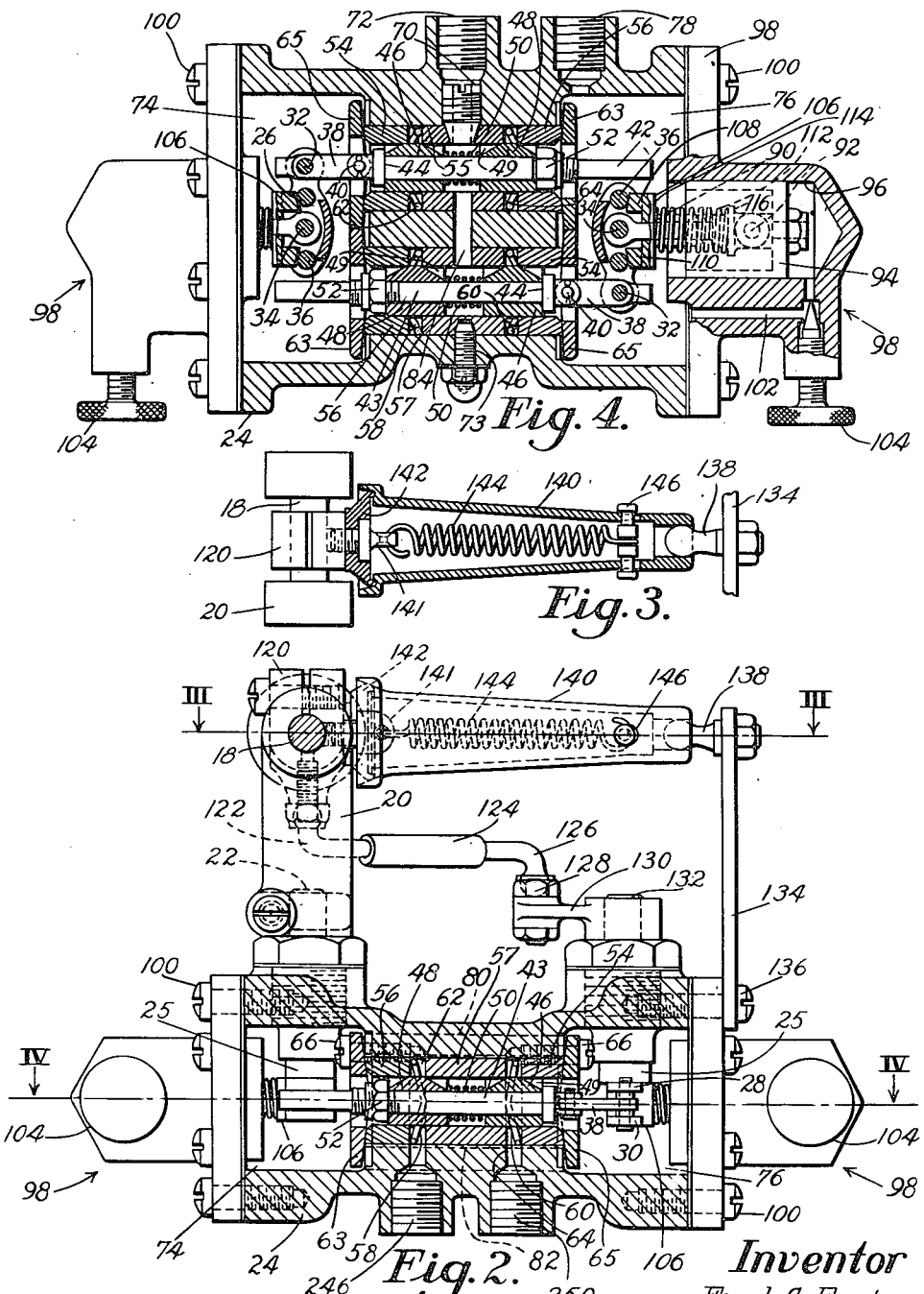

July 8, 1952
F. C. EASTMAN
2,602,671
FLUID PRESSURE POWER CONTROL VALVE
MECHANISM FOR TWO-WAY SYSTEMS
Filed March 27, 1945
3 Sheets-Sheet 3
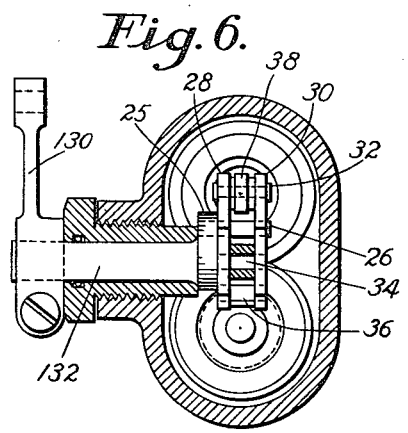
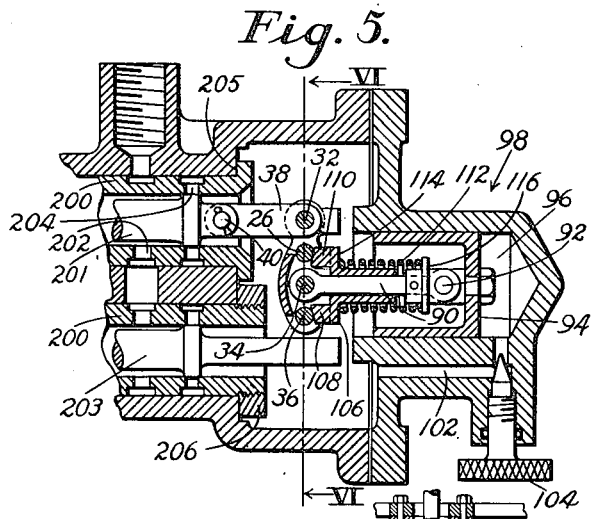
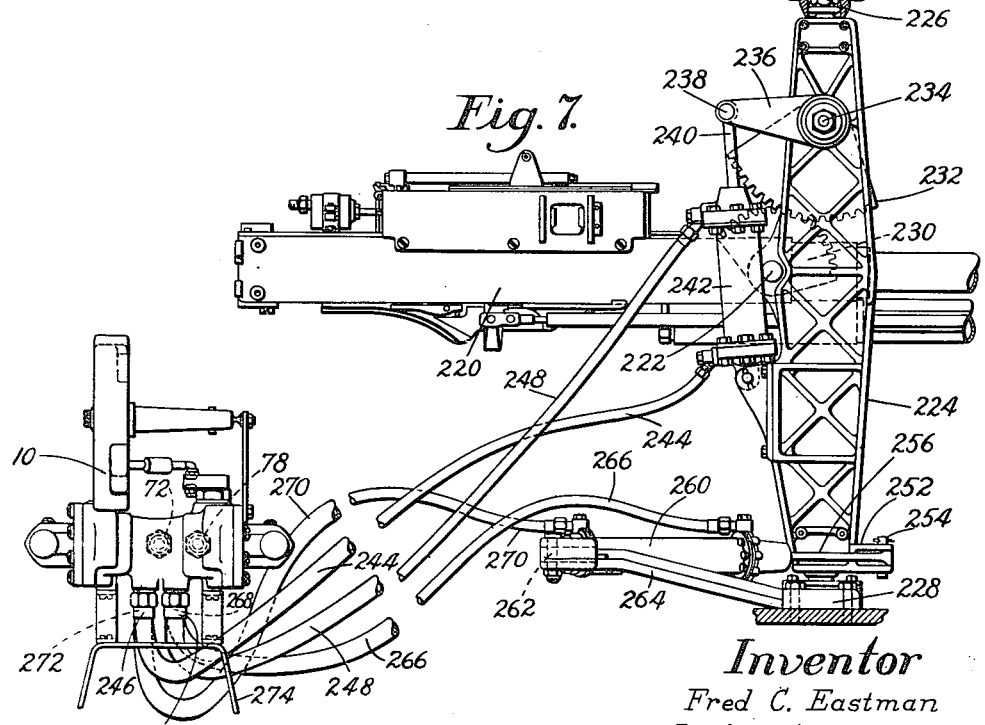
*Inventor*
Fred C. Eastman
By his Attorney Patented July 8, 1952

2,602,671

UNITED STATES PATENT OFFICE 2,602,671

FLUID PRESSURE POWER CONTROL VALVE MECHANISM FOR TWO-WAY SYSTEMS

Fred C. Eastman, Marblehead, Mass., assignor to United Shoe Machinery Corporation, Flemington, N. J., a corporation of New Jersey Application March 27, 1945, Serial No. 585,132

2 Claims. (Cl. 277—20)

This invention relates to control mechanisms, and more particularly to mechanisms for controlling a fluid pressure power system in which power may be exerted with exactitude in a plurality of directions or paths simultaneously to gain a desired objective. The invention is herein illustrated as embodied in a control mechanism for a fluid pressure system of a power operated gun mount, but it will be understood that the invention in its more general aspect is not thus limited in its applicability.

In the use of power operated gun mounts, particularly of the fluid pressure operated airplane type, it is obviously essential that the gunner control the training of the gun in both elevation and azimuth with a maximum of convenience, accuracy and sensitiveness as well as with a minimum of effort. Compactness and unification of a control unit contributes much to the convenience and such a unit should be in fine adjustment and be smooth in operation, thereby eliminating irregular or erratic gun training and also possible "hunting" of the gun. In attempting to train a gun upon a rapidly moving target by means of fluid pressure power, a gunner correcting the position of the gun in elevation alone (for example) will find two motions of the control ordinarily essential—one motion to catch up with the target and the other to "stay on" the target. The same situation will obtain as to the positioning of the gun in azimuth. Such continuous maneuvers on the part of the gunner in attempting to follow a target usually imparts coordinate or step-like movements to the gun barrel and this results in loss of time when time is of the essence in accurately directing fire. A smooth sweep of the gun barrel is desirable in order to avoid any such loss of time and this fact will be appreciated when it be realized that in modern combat between military aircraft a single combat is usually of few seconds duration. In systems requiring power to be exerted in a plurality of directions or ways simultaneously, as in the training of guns, if only a slight correction from a neutral position is required in azimuth, it is generally difficult to vary considerably the gun position in elevation without disturbing the azimuth correction and vice versa. The last unfortunate circumstance arises due to a "bump" of resistance ordinarily encountered by a gunner in manipulating any fluid pressure valve through a neutral position for reversing the fluid flow. This "bump" is due to the action of customary preloaded centering springs for the valves. In addition to these difficulties sensitivity of control ordinarily necessitates costly and accurate machining of parts as well as their fine adjustment.

It is an object of this invention to provide a mechanism for aiding an operator of a power system to control the system with a fine degree of convenience, accuracy and sensitiveness. It is a further object of the invention to provide in a fluid pressure power system a control for aiding an operator by requiring a single motion by the operator first to accelerate and then maintain a desired rate of power application. Another object is to provide a compact and unitary control device by means of which an operator may conveniently control a multiple-way fluid pressure power system—a single control for a plurality of independently operating branches of a fluid pressure system. Still another object is the provision of a control valve for such a system in which the proper alinement of parts for accuracy may be had without necessitating highly accurate and costly machining of parts. Another object is the provision of an improved control for a mechanical system, the system requiring motion by power in a plurality of directions or ways, in which manipulation of the control through, from or into neutral position may be smoothly undertaken. Another object is the provision of a device for automatically, smoothly and accurately locating a control means in a predetermined position subsequent to its release by an operator.

For the purposes in view and in accordance with further features of the invention, the illustrated machine is provided with compact control means for a fluid pressure system comprising a two-way valve structure sensitive to control and easily manufactured together with a centering device capable of automatically returning the valve structure to a neutral position, all parts cooperating to form a smoothly operating unit. A feature of the invention comprises a novel valve structure having adjustable valve parts which may be properly assembled without necessitating extreme accuracies in manufacture. Another feature pertains to a centering device for hand grip control means comprising a conical member with its base resiliently biased to a seat therefor whereby the control means tends to return to a neutral position if moved therefrom. Still another feature is a mechanical linkage associated with a movable valve element by means of which the shifting of a valve element by a controlling member or actuating means is modified automatically. By such means a single motion by the controlling member is sufficient to secure an acceleration and then a maintaining of a desired rate of power application. Another feature is a mechanical linkage through which movement is imparted to a valve element by a controlling member or actuating means, the linkage being part of an arrangement for modifying the valve element movement to increase the sharpness of the valve opening and closing.

The above and other features of the invention including novel details of construction and combinations of parts will now be more particularly described in connection with the accompanying drawings and pointed out in the claims.

In the drawings,

Fig. 1 illustrates a control mechanism in which the present invention is embodied, the mechanism being shown in elevation as viewed from an operator's position and having parts removed to show the interior of a dual valve with which the mechanism is provided.

Fig. 2 is a sectional view along the line II—II of Fig. 1;

Fig. 3 is a view partly in plan and partly in section along the line III—III of Fig. 2 and illustrating a centering device;

Fig. 4 is a view partly in plan and partly in section along the line IV—IV of Fig. 2;

Fig. 5 is a sectional view through a portion of a modified form of valve;

Fig. 6 is a sectional view along the line VI—VI of Fig. 5; and

Fig. 7 shows a fluid pressure operated gun mount with controls as disclosed in Figs. 1 to 4, the controls being drawn to a slightly larger scale than that of the mount for purposes of clarity.

The broad purpose of the present invention can perhaps be best realized by first referring to Fig. 1, which figure shows the control mechanism of this invention as it is seen by an operator. Control is provided by unitary means comprising two hand grips 10 and 12 which are locked in positions by set screws 14 and 16 on a short shaft 18 which shaft is mounted to rotate in the bearings of a U-shaped bracket 20 keyed and clamped to a valve actuating shaft 22 extending from a dual valve body 24. Integral with the actuating shaft 22 (and the same is true of a shaft 132 later to be described) is a crank member 25 (Figs. 2 and 6) having a pin 26 extending therefrom and supporting two ears 28 and 30 (for this interior valve structure, Figs. 5 and 6 may be referred to as well as Figs. 2 and 4 as the same reference characters are used for identical parts of each of the dual valves). The two ears are joined together by pins 32, 34 and 36, as shown in Figs. 4 and 6. Between each set of two ears 28 and 30 a link 38 is pivoted on a pin 32. Such a link constitutes an extension, one for each of the valve spindles 42, 43, Figs. 2 and 4, and 201, 203, Figs. 5 and 6. Each link is pivoted at a point 40 to a corresponding valve spindle. In Figs. 2 and 4, each valve spindle has a shoulder 44 against which a valve land 46 bears. A second valve land 48 is carried by each spindle 42, 43 and is spaced from the first valve land by a spring 50 placed on the spindle. Both valve lands of a given spindle are adjusted to a suitable position on the spindle by a nut 52 which may be provided with suitable locking means. The valve lands 46 and 48 have kerfs or cuts 49, as shown, and the lands fit snugly within a set of cylindrical sleeve members 54, 55 and 56 or 54, 57 and 56 which members are held in axial alinement and are spaced from each other by springs 58 and 60 (see Fig. 2) so as to form ports 62 and 64 opposite and normally closed by the lands 46 and 48. Further adjustment of the set of cylindrical sleeve members 54, 55 and 56 and set 54, 57 and 56 is had by the use of end plate members 63 and 65 held (in the case of each valve spindle 42 or 43) against the sleeve members 54 and 56, respectively, by means of set screws 66 which are threaded into the valve body, as shown in Figs. 1 and 2. The central sleeve member 55 of one valve spindle is located in proper position by a replaceable port member 70 (see Fig. 4) which is located within the main inlet port 72. The central sleeve member 57 of the other valve spindle is held in position by means of a set screw 73. Both ends of the valve body 24 have chambers 74 and 76 which are referred to herein as exhaust chambers. An exhaust port 78 (Fig. 4) is provided, leading from chamber 76, and the two chambers 74 and 76 are joined together by passages 80 and 82 (Fig. 2). The central space between the lands of each valve spindle is connected to the central space between the lands of the other spindle by a passage 84. In the interest of compactness of design it has been found advantageous to place the extending links 38 of the dual valve spindles in opposite chambers of the valve body. Each pin 34 (extending between each set of ears 28 and 30) bears a rod 90 pivoted upon it and extending endwise from the valve body 24 and pivotally connected at point 92 to a piston 94 which is slidable in a cylinder 96 of a dash pot arrangement generally indicated as 98 tightly secured to the body 24 by screws 100. A small passage 102 is provided to bypass the piston of each dash pot arrangement and a needle valve device 104 is utilized to control the bypass passage. Each rod 90 carries a bracket 106 which is slidable thereon and which carries projections 108 and 110 (Fig. 5) normally engaging the pins 36 and 26, due to the compression of a spring 112 mounted between a shoulder 114 on the bracket and an annular element 116 pinned to the rod 90. As can be easily seen, one dash pot arrangement 98 serves to modify the effect of the control member 22 on the position of valve spindle 42, and the other dash pot arrangement 98 serves to modify the effect of a control member 132 on the position of the valve spindle 43. Rigidly attached to the short shaft 18 (see Figs. 1 and 2) is a bracket 120 having a right angle link 122 universally pivoted thereto and connected at its other end to a sleeve member 124 attached to a second right angle link 126 universally pivoted at 128 to a lever 130 keyed to the valve actuating member 132 of the second valve spindle 43. At one end of the valve body 24 a vertical plate 134 (Fig. 2) is rigidly mounted by means of set screws 136 and which bears at its top a pivotal mounting 138 for the small end of a conical member 140 constituting a centering device (in a neutral position) for the control grips. It is to be noted bracket 120 is mounted for rotation about two axes intersecting closely adjacent the valve body. The bracket 120 has fastened thereto a seat member 142 against which the conical member 140 is biased by the tension of a resilient member or spring 144 placed in tension between an eye 141 on the seat member 142 and a pin 146 mounted in the small end of the cone member.

The dash pot construction of Figs. 2 and 4 is identical with that shown in Fig. 5, except that in Fig. 5 a slightly different type of valve is shown in which single sleeve members 200 are used having radial ports 202 and 204 in place of annular ports as shown in Fig. 4. Each sleeve member 200 is retained in place by a shoulder 205 and a nut 206. The valve spindles, also of a different type, have sharply defined lands (for sharp reversals of flow) in place of the kerfs 49 of Figs. 2 and 4, the latter being used when a finer flow regulation is desired.

In the application of the control mechanism for the training of a gun, the hand grips 10 and 12 may be easily and accurately manipulated to produce the desired movement of the gun in elevation or in azimuth or in both azimuth and elevation. Referring to Fig. 7, a conventional machine gun 220 is shown pivoted at 222 on a yoke 224 for movement in elevation. The yoke 224 is mounted in bearings 226 and 228 permitting the gun to swing in azimuth. A gear segment 230 is mounted to rotate in elevation with the gun about the pivot 222. A second gear segment 232 having teeth in mesh with the teeth of gear segment 230 is keyed to a shaft 234 pivotally mounted in the yoke 224. An arm 236, also keyed to the shaft 234, is pivoted at 238 to a piston rod 240 connected to a piston in a power cylinder 242. One end of the cylinder 242 is connected by a hose 244 to a port 246 of the dual valve body 24, that port communicating with the annular port 62 controlled by the land 48 of valve spindle 43. The other end of power cylinder 242 communicates with the other annular port 64 of the same spindle 43 by means of a hose 248 and valve body port 250 and the communication is controlled by land 46. A bracket 252 extends from the base of yoke 224 and pivoted to it by means of a pin 254 is a piston rod 256 connected to a piston within a second power cylinder 260 pivoted by means of a pin 262 to a stationary member or support 264. A hose 266 connects one end of cylinder 260 to a valve body port 268 located behind port 250 (Fig. 7) and leading to annular port 64 controlled by the land 48 of spindle 42. A hose 270 from the other end of cylinder 260 leads to a valve port 272 located behind the port 246, fluid passage being controlled by land 46 of spindle 42. The dual valve and associated parts may be suitably mounted on a support 274 in a convenient and appropriate position. The valve body port 72 (Figs. 4 and 7) leads from some convenient source or system of fluid pressure into the dual valve body 24 and port 78 serves as an exhaust or discharge port from the valve body back to the same system.

In operation a gunner grasps the hand grips 10 and 12 and if he wishes to elevate the barrel of gun 220 he rotates the grips in a counterclockwise direction, as viewed in Fig. 7, with the result that the valve spindle 43 is shifted to the left as viewed in Fig. 2, thus opening port 62 to the passage of pressure fluid from ports 72, 70 and 84 through a kerf 49 of land 48 and out from port 246 into hose 244. Fluid pressure, acting upon the piston within cylinder 242, lifts the piston rod 240 and, because of the action of gear segments 232 and 230, the gun barrel is elevated. At the same time fluid is exhausted from the cylinder 242 through hose 248, port 250, annular port 64, by land 46 into chamber 76 and out through exhaust port 78. If hand grips 10 and 12 are swung clockwise as viewed in Fig. 7, spindle 43 will move to the right (Fig. 2) to open port 64 to the pressure fluid and the gun barrel will be lowered due to passage of pressure fluid into hose 248. Exhaust at this time will be through a kerf 49 of land 48 into chamber 74, through passages 80 and 82 to chamber 76 and out through port 78. If the gunner desires to swing the gun barrel to the right he will turn the hand grips in a clockwise direction as viewed from above and this (through the bracket 20, actuating member or shaft 22 and mechanical linkage) will bring into operation the valve spindle 42 which will shift to the right as viewed in Fig. 4. This will permit pressure fluid to pass through port 268 into hose 266 and cause piston rod 256 to swing the gun barrel and yoke to the gunner's right. Exhaust will be through hose 270, port 272, through a kerf 49 of land 46, into chamber 74, through passages 80 and 82 into chamber 76 and out through port 78. Rotation of the hand grips in the reverse direction will swing the gun to the left as will be understood. As the operation of each valve is entirely independent of the operation of the other valve it can be seen that the gun may be moved in elevation only, in azimuth only, or in both azimuth and elevation simultaneously. The foregoing description has ignored the operation of the two dash pot arrangements which will now be described. They are similar in construction and in operation. Assuming that the actuating member or shaft 132 is rotated in a clockwise direction, as viewed from above, the corresponding pin 26 and ears 28 and 30 will be shifted to the left, as viewed in Figs. 2 and 4, and this same is true of valve spindle 43 since the ears 28 and 30 must turn about the pin 34 which cannot change its position until the piston 94 moves. This rotation of the ears 28 and 30 about the axis of pin 34 will throw pin 36 to the right thus compressing spring 112. Immediately, however, the piston 94 and pin 34 will be forced to the left under the action of the spring 112 and will continue so to move until the abutments 108 and 110 are again brought to bear on their associated pins 36 and 26 with the result that spindle 43 will be shifted back to the right slightly. In other words rotation of pin 26 (Fig. 4) either to the right or to the left moves spindle 43 from an original position and causes either pin 26 or pin 36 to act upon either projection 110 or projection 108, as the case may be, compressing spring 112. This means that pins 32, 26, 34 and 36 are thrown out of alinement for a short interval of time the length of which is determined by the adjustment of the needle valve 104. In other words, the range of movement of the valve spindle is momentarily increased as the pivot points in the mechanical linkage are varied in effectiveness. It will be understood that when the piston 94 moves by action of the spring 112 its motion is resisted by the regulated restriction offered to the displacement of pressure fluid through passage 102. As pressure fluid is permitted to flow through passage 102 the expansion of spring 112 again places pins 32, 26, 34 and 36 in alinement and the valve spindle 43 (Fig. 4) is retracted part way toward its original position. With the parts proportioned, as shown, the return movement is equal to one-half of the original valve displacement. Whether the shaft 132 be rotated in one direction or the other, the same action of the dash pot arrangement will obtain—i. e.—the valve spindle 43 will shift a distance equal to 2X (in the selected direction and twice the distance required to "stay on" a moving target) and then retract a distance equal to X. By such construction a gunner wishing to train his gun upon a moving target will be enabled to accelerate the swinging of his gun barrel in azimuth or in elevation or in both to "catch up" with his moving target and the rate of motion of his gun will then automatically be reduced or modified facilitating his "staying on" the target.

With the modified valve structure of Fig. 5 the operation of the dash pot arrangement is similar to that of Figs. 2 and 4 but in this case the sharp outlines of the valve lands indicate that the structure is adapted for use where the valve is to be operated in practically three positions only—fully opened in one direction, fully opened in the other direction or fully closed as to both directions. In such structure, the dash pot arrangement is advantageous as it increases the rapidity with which the valve may be closed or opened in either direction.

Sensitivity and proper operation of the valves require highly accurate relative adjustment and proportioning of the valve ports and lands. In Figs. 2 and 4 the valves are so constructed that costly machining is avoided and yet the valves may be easily adjusted for smooth and sensitive actuation. The two central sleeve members 55 and 57 are easily and properly located with relation to ports 72 and 84 by the member 70 and set screw 73 respectively. The proper width of annular ports 62 and 64 of each valve spindle may be secured by the use of screws 66 bearing on plates 63 and 65 of each spindle to compress springs 58 and 60. The spacing of the valve lands on the spindles in order that they register properly with ports 62 and 64 may be easily adjusted with the readily accessible nuts 52.

The centering device or cone 140 of Fig. 3 eliminates "bumps" or any irregularities in the motion of the control grips 10 and 12 through the neutral zone whether such motion be at any angle about the pivot point of bracket 120. The cone 140, upon being rocked relative to the seat member 142 from the position shown in Figs. 2 and 3, will very gradually and smoothly be unseated and resistance by spring 144 will gradually increase as the cone is unseated. This results in an operator being relieved entirely of the strain of spring 144 when the control handles or grips 10 and 12 are in the central or neutral position and of being aware of an increasingly greater strain as the valves are opened to a larger extent. Accordingly, the operator is conscious of the extent to which he goes in the act of controlling his fluid pressure system and he is not distracted by any irregularities in resistance as the control passes through the neutral position.

It can now be seen that the apparatus, as a whole, is a compactly integrated control mechanism whereby an operator may smoothly and accurately control the application of power from a fluid pressure system into two independently operated fluid pressure branches of that system, the branches being of such a nature and so applicable as to cooperate in securing a unitary result desired by the operator. It can be seen that the training of a gun upon a target is but one example of the fields to which the invention may be applied.

Having described my invention, what I claim as new and desire to secure by Letters Patent of the United States is:

1. A compact control mechanism for a two-way fluid pressure system comprising a valve body with a movable valve element in said body for each of said ways, and actuating means for each of said valve elements mounted on said body, the said actuating means comprising a rotatable shaft entering said body and attached to one of the movable valve elements by a motion transferring link, a dash-pot connected to said link to modify motion of the latter and a spring arranged between the dash-pot and the link partially to retract the link and its corresponding valve element subsequent to a preceding motion imparted to the said link and valve element by said rotatable shaft.

2. Control apparatus for a fluid pressure system comprising a valve element in a valve body, a handle for said element, actuating means interposed between the said handle and valve element, said actuating means including a dash-pot linked to said element for aiding in transferring an initial motion of said handle to said valve element and a spring to retract a predetermined portion of said initial motion.

FRED C. EASTMAN.

REFERENCES CITED

The following references are of record in the file of this patent:

UNITED STATES PATENTS

| Number | Name | Date |
|---|---|---|
| 2,104,502 | Allen | Jan. 4, 1938 |
| 2,205,788 | Camerota | June 25, 1940 |
| 2,321,000 | Bennett | June 8, 1943 |
| 2,329,742 | Bush | Sept. 21, 1943 |
| 2,337,166 | Overbeke | Dec. 21, 1943 |
| 2,345,223 | Upp | Mar. 28, 1944 |
| 2,345,224 | Upp | Mar. 28, 1944 |
| 2,387,008 | Buchanan | Oct. 16, 1945 |
| 2,394,462 | Maurer | Feb. 5, 1946 |
| 2,395,633 | Livers | Feb. 26, 1946 |
| 2,396,643 | DeGanahl | Mar. 19, 1946 |
| 2,400,385 | Blaylock | May 14, 1946 |
| 2,403,519 | Gardiner | July 9, 1946 |
| 2,411,270 | Hart | Nov. 19, 1946 |
| 2,425,433 | Linderoth | Aug. 12, 1947 |

FOREIGN PATENTS

| Number | Country | Date |
|---|---|---|
| 126,505 | Great Britain | of 1919 |